United States Patent [19]

Davis, Jr.

[11] Patent Number: 4,607,406
[45] Date of Patent: Aug. 26, 1986

[54] COMBINATION AUTOMOBILE FOLDING TOOL

[75] Inventor: Robert D. Davis, Jr., Jackson, Mich.

[73] Assignee: Ryerson & Haynes, Inc., Jackson, Mich.

[21] Appl. No.: 760,047

[22] Filed: Jul. 29, 1985

[51] Int. Cl.⁴ .............................................. B25F 1/00
[52] U.S. Cl. ........................................ 7/100; 7/138; 81/177.6; 81/177.7
[58] Field of Search .................... 7/100, 138, 165, 166; 81/177.6, 177.7, 177.8, 437, 439, 440, 450

[56] References Cited

U.S. PATENT DOCUMENTS

| | | | |
|---|---|---|---|
| 1,413,698 | 4/1922 | Adams . | |
| 1,415,826 | 5/1922 | Finkhousen | 7/138 X |
| 1,594,081 | 7/1926 | Van Duzer . | |
| 1,597,747 | 8/1926 | Wermes . | |
| 2,504,345 | 4/1950 | Nellis | 7/100 |
| 2,786,380 | 3/1957 | Rolland | 7/138 X |
| 3,161,093 | 12/1964 | Hoag | 81/177.6 |
| 3,364,508 | 1/1968 | Garrett | 7/165 X |
| 4,236,266 | 12/1980 | Hannah et al. | 7/100 |
| 4,271,731 | 6/1981 | Suligoy et al. | 81/177.7 |

FOREIGN PATENT DOCUMENTS

| | | | |
|---|---|---|---|
| 544751 | 4/1942 | United Kingdom | 81/177.6 |
| 802015 | 9/1958 | United Kingdom | 7/100 |

*Primary Examiner*—James G. Smith
*Attorney, Agent, or Firm*—Beaman & Beaman

[57] ABSTRACT

A combination tool for automobile use having components foldable into an elongated body, the tool being usable for tire replacement and screw jack operation. An elongated body of U transverse cross section includes an annular socket pivotally affixed at one end for connection to a hexagonal bolt or jack screw head, and a handle is pivotally connected to the body other end movable between crank handle positions and an extended position in alignment with the body length. A lock slide is selectively positionable upon the body between positions retaining the handle within the body and locking the handle in alignment with the body length.

11 Claims, 7 Drawing Figures

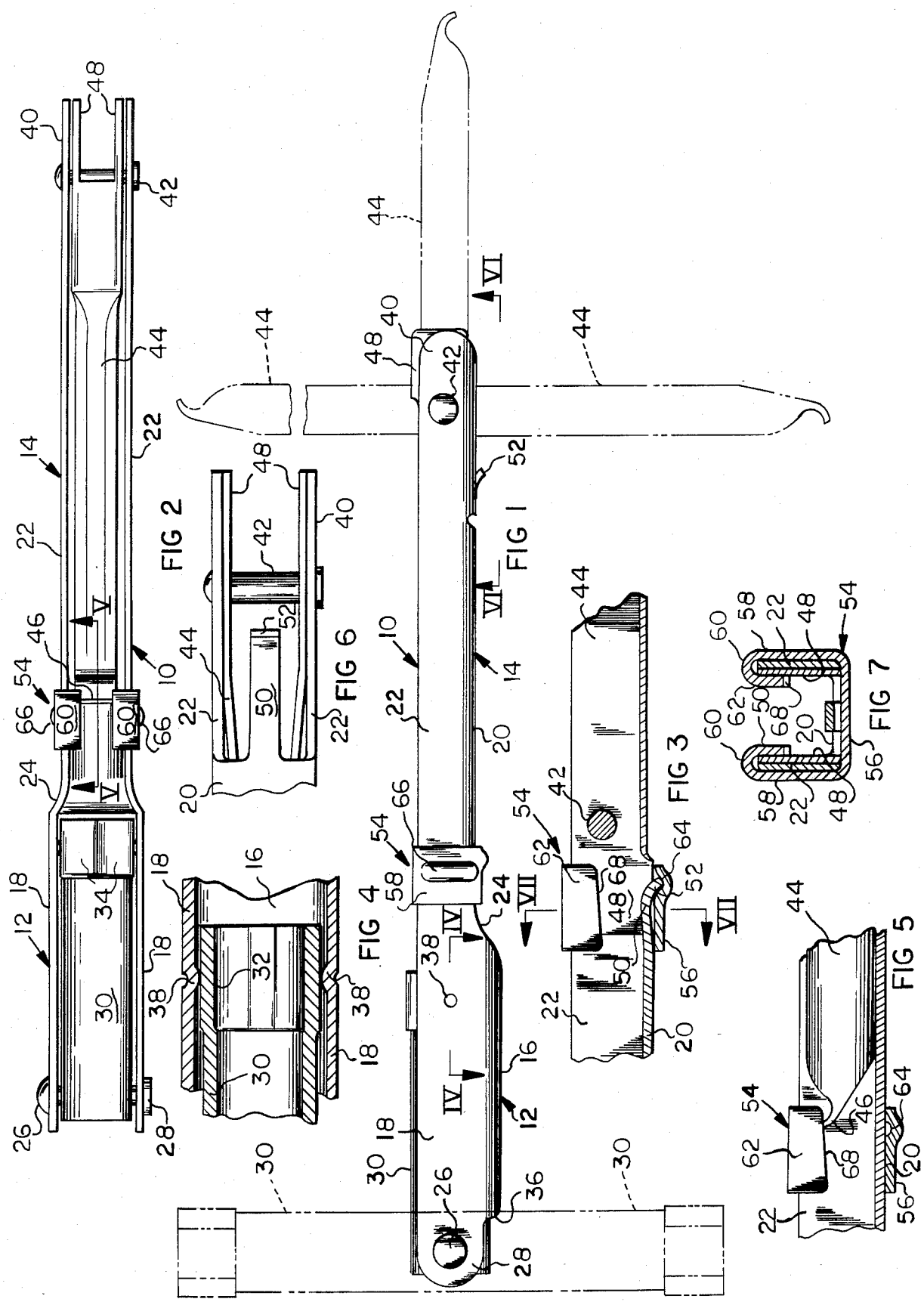

COMBINATION AUTOMOBILE FOLDING TOOL

BACKGROUND OF THE INVENTION

Automobile tools for use in changing tires and operating jacks often utilize folding components to minimize the storage space occupied by the tool and aid in tool use. Such tools may include socket and handle portions and examples of such tools are shown in U.S. Pat. Nos. 1,413,698; 1,594,081; 1,597,747; 3,161,093 and 4,236,266.

While combination tools for automobile use are known, there is a need for an automobile tool of concise configuration having socket and handle portions pivotal with respect to a body wherein the tool may be used as a crank to facilitate wheel nut removal and assembly, or operate a screw jack. Additionally, there is the need for a combination automobile tool which can be employed to remove wheel covers, and wherein the tool, while in the stored, folded condition is of concise configuration, and may be unfolded in such a manner that a high wrenching torque may be readily achieved for turning stubborn wheel nuts.

It is an object of the invention to provide a combination automobile tool having a concise folded storage condition, and, yet, the components may be readily pivoted to a plurality of operating positions requiring little skill or aptitude.

Another object of the invention is to provide a combination automobile folding tool wherein the tool includes socket and handle portions capable of being folded into the handle configuration and maintained therein substantially free of vibration and rattles.

An additional object of the invention is to provide a combination automobile tool formed of stamped sheet material having a handle pivotally mounted upon one end of a body, and a lock slide positionable on the body locks the handle within the body in the handle folded condition and also locks the handle in the body extension position in alignment with the handle length to increase the effective torque arm when the tool is used as a wrench.

Yet another object of the invention is to provide a combination automobile tool having foldable components and a locking slide positionable upon a body wherein a detent homogeneously defined in the body cooperates with the locking slide for locking a handle in alignment with the body length.

In the practice of the invention the combination tool includes an elongated body of a transverse U cross-sectional configuration defined by a base and depending legs. The body U configuration adjacent one end is of slightly greater depth and width than the body configuration adjacent the other body end. An elongated tubular socket is pivotally attached to the body end of greatest dimension and is pivotal between a stored position between the body legs and operative positions transversely disposed to the body length, or in alignment therewith. The outer end of the socket is provided with a hexagonal bore for receiving wheel nuts, or a jack screw head, in torque transferring relationship.

At its other end, an elongated handle is pivotally attached to the body and is also storable within the body configuration between the adjacent base and legs. The handle includes an outer end shaped with a pry configuration to aid in removing wheel covers and the handle includes projections extending beyond the associated pivot for cooperation with a lock slide axially displaceable upon the body.

The lock slide cooperates with the handle projections when the handle is in alignment with the body length as to constitute an extension of the body, and when in such location the lock slide cooperates with a detent tang homogeneously formed in the body base for retaining the handle in its body aligned position. Movement of the lock slide toward the socket end of the body permits the handle to be stored within the body and the lock slide includes cam surfaces engaging the handle for retaining the handle within the body during storage.

Frictional detents defined on the body frictionally engage the socket while in the stored position, and these detents, and use of the lock slide to retain the handle in the stored condition, prevent rattling of the wrench components during storage.

The variety of pivotal relationships which the socket and handle are capable of relative to the body permits the tool to be used as a crank when associated with wheel nuts, or the head of a scissors jack having a threaded shaft. Alignment of the handle to the body and locking thereto by the lock slide increases the effective length of the body for permitting higher torques to be achieved when engaging wheel nuts or the jack screw, or such alignment of the handle permits an effective tool length when used to remove wheel covers.

BRIEF DESCRIPTION OF THE DRAWINGS

The aforementioned objects and advantages of the invention will be appreciated from the following description and accompanying drawings wherein:

FIG. 1 is a side, elevational view of a combination automobile tool in accord with the invention with the components in the stored position, and the socket and handle being illustrated in various operative positions in phantom lines, FIG. 2 is a top, plan view of the tool of FIG. 1 with the components in the folded position, FIG. 3 is a sectional, enlarged, elevational, detail view of the handle when in alignment with the body and the lock slide engaging the handle projections and body detent, FIG. 4 is an enlarged, sectional view taken through the socket and body illustrating the dimple detents as taken along Section IV—IV of FIG. 1, FIG. 5 is a detail, elevational, sectional view illustrating the lock slide holding the handle in the storage position as taken along Section V—V of FIG. 2, FIG. 6 is an enlarged, detail view of the handle end of the tool illustrating the detent as taken along Section VI—VI of FIG. 1, and FIG. 7 is an elevational, sectional view taken through the lock slide when holding the handle in the body alignment position as taken along Section VII—VII of FIG. 3.

DESCRIPTION OF THE PREFERRED EMBODIMENT

The primary component of a combination automobile tool in accord with the invention is the elongated body 10 which is stamped and drawn of steel. The typical length of the body is about twelve inches, and the thickness of the sheet metal from which the body is formed is approximately 3/32". The body is of a U transverse cross-sectional configuration throughout its length and consists of a socket receiving region 12, and a handle receiving region 14. The socket receiving region 12 is defined by the base 16 from which depend parallel spaced legs 18, while the handle receiving region 14 is defined by base 20 and spaced parallel legs 22. The spacing between the legs 18 and the length of these legs is slightly greater than the spacing between the legs 22 and the length of the legs 22 wherein the cross-sectional dimension of the region 12 is greater than that of region 14, as will be appreciated from FIG. 1. The regions 12 and 14 merge at transition portions 24 indicated in FIGS. 1 and 2.

A pivot pin 26 is mounted within the wrench socket end 28 of the body between the legs 18 and the tubular elongated socket 30 is pivotally mounted thereon. The socket 30 includes an outer free end which is shaped of a hexagonal configuration forming a hexagonal bore 32 and exterior flats 34. The hexagonal bore 32 is of such dimension to closely receive the wheel lug nuts for the automobile with which the tool is associated, and receive the hexagonal head of the threaded shaft of the scissors jack of the associated vehicle, not shown.

The pivotal mounting of the socket 30 on the pin 26 permits the socket to pivot from the stored position between the legs 18 to the phantom line positions shown in FIG. 1 wherein the socket may be positioned 90°, 180°, not shown, or 270° out of the stored position. The base 16 is removed at 36 in order to permit the socket to pivot to the 270° position.

Dimple detents 38, FIG. 4, are formed in the legs 18 and frictionally engage the socket 30 when folded to the stored position, FIG. 4. The frictional engagement of the detents 38 with the socket is sufficient to retain the socket within the body region 12 in a rattle-free manner, but the frictional retention may be readily overcome by the user inserting a finger in the socket bore 32 to pull the socket from the region 12.

The handle end 40 of the body is provided with a pivot pin 42 extending between the legs 22 and the base 20 is partially removed wherein the end 40 defines a fork as apparent in FIG. 6. The elongated handle 44 is pivotally mounted upon the pivot pin 42 and the handle is preferably formed of sheet metal curved to define a tubular form adjacent its outer free end. The outermost portion of the handle 44 is formed with a pry lip 46 which may be inserted under the wheel cover for removing the cover to provide access to the wheel lug nuts. At its inner end, the handle is provided with a pair of rectangular projections having a dimension transverse to the handle equal to the length of the legs 22 plus the thickness of the base 20.

The handle 44 may be pivoted between the stored position within the legs 22 to the 90°, 180° or 270° positions represented by phantom lines in FIG. 1. At the 90° and 270° positions, the handle 44 will normally be used as a crank, while in the 180° position the handle constitutes an extension of the length of the body 10, and in this position the handle is used to increase the torque transmittable by the tool when using the socket 30 on a nut, or the tool is being used as a pry lever to remove a wheel cover.

As will be appreciated from FIGS. 3 and 6, the body base 20 is partially removed adjacent the end 40 to define a longitudinally extending cantilevered tang 50 which forms a detent adjacent the end 40. The tang 50 at its free outer end 52, is deformed outwardly, FIG. 3, for cooperation with the lock slide, as later described.

The lock slide 54 is of a general U configuration and is slidably mounted upon the body region 14 and includes a base 56 which extends across the body base 20 and legs 58 extend parallel to the body legs 22. The legs 58 include hooks 60 which extend over the outer end of the legs 22 terminating in portions 62 spaced from the associated legs 58 a distance equal to the thickness of the legs 22 and the handle projections 48. A recess 64 is defined in the slide base 56 and portions 66 are bulged outwardly on legs 58 to improve finger engagement with the lock slide.

When the handle 44 is in alignment with the length of body 10, as shown in FIG. 3, the lock slide 54 may be moved toward the end 40 until the handle projections 48 are received within the hooks 60, FIG. 7. The lock slide base recess 64 receives the outer end 52 of the detent tang 50, and in this manner the lock slide is locked in its operative position holding the handle 44 in alignment with the length of the body. This firm connection between the body 10 and handle 44 permits relatively high prying forces to be imposed upon the handle, and the contiguous engagement of the handle projections 48 with the legs 22 permits high torque forces to be transferred to the body by the handle 44 when turning nuts.

The lock slide 54 is removed from the position of FIG. 3 by sliding the lock slide to the left which deflects the tang 50 inwardly out of engagement with the recess 64, and the lock slide may be moved to a position adjacent the transition portions 24. Finger portions 66 aid in the manual displacement of the lock slide.

When the handle 44 is pivoted between the legs to the stored position 22, the lock slide 54 may be moved toward the handle causing the inclined cam surfaces 68 defined on the lower edges of the lock slide portions 62 to engage the pry lip 46 wedging the handle 44 inwardly in a rattle-free position within the body, FIG. 5, and also locking the lock slide on the body 10 in a vibration free manner.

In the above description it will be appreciated that a concise automobile tool is provided wherein socket and handle components are easily stored within the body in a vibration-free manner. The pivotal connection of the socket 30 and handle 44 to the body 10 permits a variety of relative positions of these components and with the socket 30 in the 90° position and the handle 44 in the 270° position, for instance, a crank wrench is produced for rapidly rotating wheel lug nuts or a scissor jack screw, and annular relationships of the socket and handle intermediate those shown in phantom lines can be provided to produce a crank having a relatively small torque arm as may be needed when using the tool with a retracted jack before the jack is extended and ground clearance is restricted.

The rigid interconnection between the handle 44 and body 10 produced by the lock slide 54 effectively increases the length of the body for torque or pry bar purposes, and the stamped and drawn fabrication of sheet metal reduces the cost of the tool, and the homogeneous defining of the detents 38 and 50 of the body material simplifies production and assembly without sacrificing operating characteristics.

It is appreciated that various modifications to the inventive concepts may be apparent to those skilled in the art without departing from the spirit and scope of the invention.

I claim:

1. A combination automobile tool comprising, in combination, an elongated body of U transverse cross section defined by a base and spaced parallel legs depending from said base, said body including an elongated first end region terminating in a first end and an elongated second end region terminating in a second end, a first pivot pin mounted upon said first end extending between said legs, an elongated handle pivotally mounted upon said first pivot pin movable between a storage position wherein said handle is stored between the legs of said first end region, an extension position wherein said handle is in alignment with the length of said body and a crank position wherein said handle is transversely disposed to the length of said body, a second pivot pin mounted upon said second end extending between said legs, an elongated tubular socket having an inner end pivotally mounted upon said second pivot pin and an outer end, nut engaging flats defined upon said socket outer end, said socket being pivotal between a storage position wherein said socket is stored between the legs of said second end region and a use position wherein said socket outer end is accessible for attachment to a nut, and a lock slide movably mounted on said body first end region for movement toward and away from said first end engagable with said handle when said handle is in said extension position locking said handle in said extension position.

2. In a combination automobile tool as in claim 1 said body being formed of stamped and drawn sheet metal.

3. In a combination automobile tool as in claim 1, said handle having an outer end, and a pry edge defined on said handle outer end.

4. In a combination automobile tool as in claim 1, a releasable lock slide retaining detent defined on said first end region adjacent said first end engaging said lock slide when said lock slide is adjacent said first end locking said handle in said extension position.

5. In a combination automobile tool as in claim 4, said detent comprising an elongated cantilevered tang having a free outer end, said tang being formed of the material of said body base and said tang free end being disposed outwardly of the configuration of said base, and a recess defined in said lock slide receiving said tang free end.

6. In a combination automobile tool as in claim 5, said lock slide comprising a base portion disposed adjacent said body base and leg portions each disposed adjacent a body leg.

7. In a combination automobile tool as in claim 1, said lock slide comprising a U-shaped member having a base portion disposed adjacent said body base and leg portions each disposed adjacent a body leg, said leg portions terminating in hooks extending over said body legs, said handle including projections received within said hooks to lock said handle in said extension position.

8. In a combination automobile tool as in claim 1, said lock slide having a storage position remote from said body first end, and means defined upon said lock slide engaging said handle when said handle is in said storage position and said lock slide is in said storage position maintaining said handle in said handle storage position.

9. In a combination automobile tool as in claim 8 wherein said means defined upon said lock slide engaging said handle comprise cam surfaces defined upon said lock slide.

10. In a combination automobile tool as in claim 1, a hexagonal bore defined in said socket intersecting said socket outer end defining said nut engaging flats.

11. In a combination automobile tool as in claim 1, an inwardly extending projection defined upon at least one of the legs of said second end region frictionally engaging said socket when said socket is in said storage position to releasably retain said socket in said storage position.

* * * * *